June 2, 1936.  T. J. SCOFIELD  2,042,556
CONDENSER
Filed Jan. 29, 1927
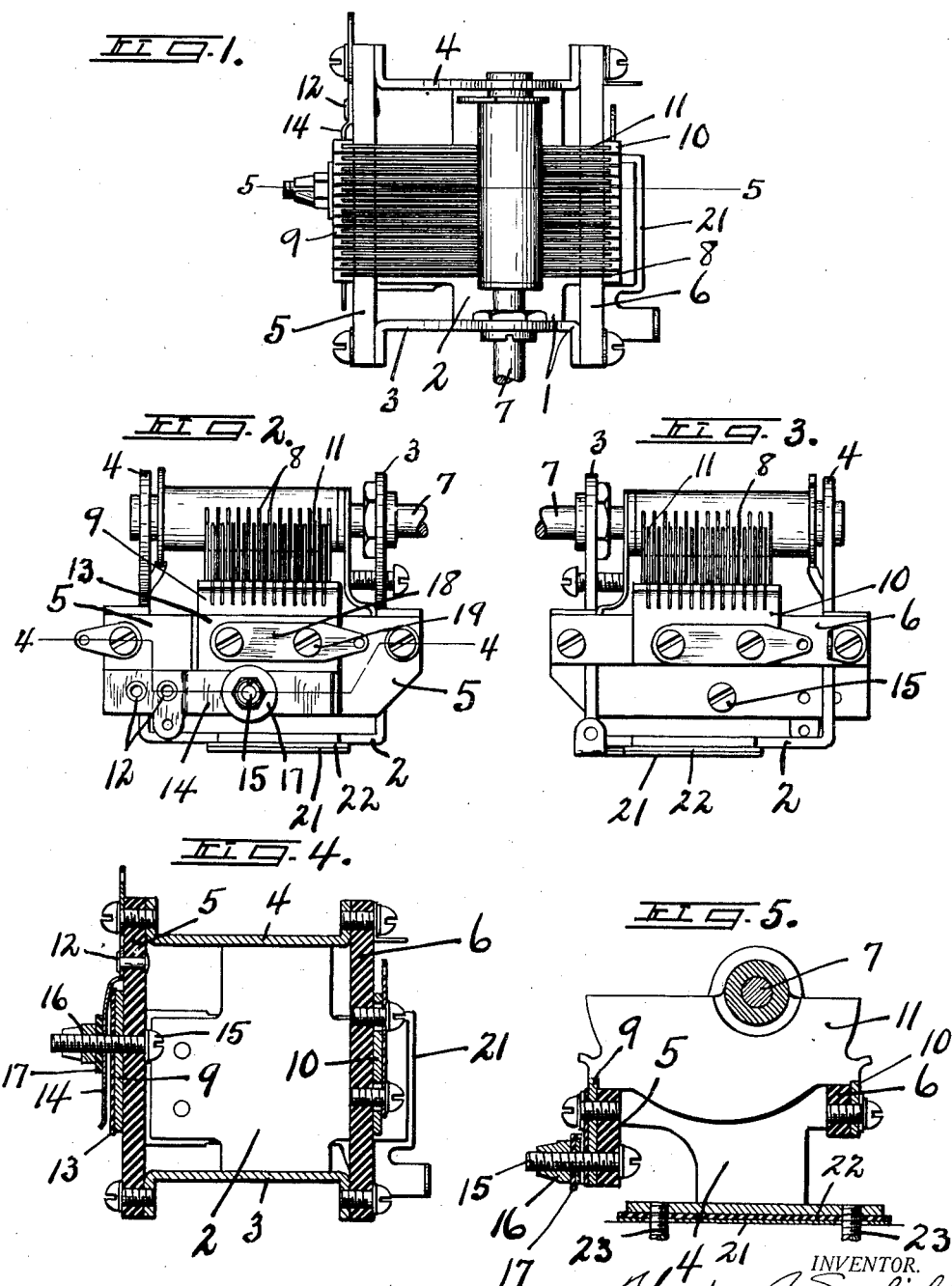
WITNESS
INVENTOR.
Theodore J. Scofield
BY
Denison & Thompson
ATTORNEYS.

Patented June 2, 1936

2,042,556

UNITED STATES PATENT OFFICE 2,042,556

CONDENSER

Theodore Johnson Scofield, Jackson, Mich., assignor, by mesne assignments, to Radio Corporation of America, New York, N. Y., a corporation of Delaware Application January 29, 1927, Serial No. 164,481

3 Claims. (Cl. 175—41.5)

This invention relates to certain new and useful improvements in condenser structures.

More especially the invention relates to an assembly of condensers whereby a compact apparatus is produced, and in which parts of one condenser are utilized as parts of two or more condensers of either the variable or fixed type.

Other objects and advantages relate to the details of the structure and the form, position and relation of the parts thereof, all as will more fully appear from the following description, taken in connection with the accompanying drawing, in which:

Figure 1 is a top plan view of an apparatus of this invention.

Figure 2 is an elevation of one side of the same.

Figure 3 is an elevation of the opposite side of the same.

Figure 4 is a section on line 4—4, Figure 2.

Figure 5 is a section on line 5—5, Figure 1.

The apparatus as shown comprises a frame 1, including a base 2 and the two end walls 3 and 4 respectively. This frame may be formed of a single piece of metal bent in the desired shape. The opposite sides of the end-walls 3 and 4 are connected to each other by bars 5 and 6 respectively formed of insulating material. The end walls 3 and 4 constitute bearings for the rotor shaft 7 which carries rotor plates 8, while the insulating bars 5 and 6 carry upright brackets 9 and 10 respectively to which the stator plates 11 are secured as by solder or the like. The rotor and stator plates are alternately positioned in the usual manner. The structure so far described constitutes in general an ordinary condenser.

The features of this invention reside in the fact that portions of this ordinary condenser are utilized as portions of one or more additional condensers of either the variable or fixed type.

As shown, the bracket 9 which is formed of metal, is utilized as one plate of a condenser, and for this purpose a second condensing plate 14 is secured to the bar 5 near one of the ends of the latter, as by rivets 12, and extends laterally across the upright bracket 9, and is separated therefrom by a strip of insulating material 13, such as mica or the like.

The bar 14 is formed of some spring material, and is tensioned away from the insulating strip 13, but is adjusted toward the strip and held in desired position by means of screw 15 which extends through bar 5, bracket 9, insulating strip 13 and through an opening in the plate 14 which is somewhat larger in diameter than the diameter of the screw so as not to contact with the screw.

All of these parts are maintained in proper position by means of nut 16 threaded on the outer end of the screw and separated from the plate 14 by an insulating disk 17.

In this manner, by utilizing the upright bracket 9, a variable condenser is formed merely by the use of an insulating strip, and a second condensing plate, with means for holding the parts in proper position.

The insulating strip 13 extends some distance upwardly along the bracket 9 above the plate 14, and a second condenser is formed utilizing the bracket 9 as one plate thereof, and a second metallic strip 18, as the second plate thereof, these plates being separated by the insulating strips 13. The plate 18 is secured in proper position by means of screws 19 extending through the plate, through the insulating strip 13, and through openings in the bracket 9 which are of larger diameter than the diameter of the screws 19 and are threaded into the insulating bar 5.

The base 2 of the frame which supports the rotor shaft 7 is also utilized as one plate of a condenser, and this is effected by utilization of a metallic condenser plate 21 of a size substantially the same size as the base 2, and lying flat against an insulating strip 22 which in turn lies flat against the base 2 to insulate the base 2 from the plate 21. These parts are secured in position by the screws 23 which connect the frame 1 to a suitable support for the entire condenser structure.

In this manner, it will appear that the structure of a single condenser by the addition of comparatively few parts has been made into a condenser structure consisting of four condensers, two of which are variable, and certain of which utilize portions electrically connected to the rotor structure, and others of which utilize portions of the structure electrically connected to the stator structure.

Altho I have shown and described a particular form, construction and relation of the parts of the condenser structure of this invention, I do not desire to restrict myself to the details of the same, as various changes and modifications may be made within the scope of the appended claims.

I claim:

1. In a variable condenser having a framework comprising metal end walls joined by opposed insulating bars, a shaft journaled in said end walls, rotor plates secured to the shaft, metal brackets mounted on said insulating bars, stator plates secured normally to the metal brackets, one of said brackets having an extension adapted to serve as a plate for an additional condenser, a metal plate and insulating strip cooperating with said bracket extension to form said additional condenser.

2. In a variable condenser having a framework comprising a metal base and metal end walls joined by opposed insulating bars, a shaft journaled in said walls, rotor plates secured to said shaft, metal brackets mounted on said insulating bars, stator plates secured normally to said metal brackets, one of said brackets having an extension adapted to serve as a plate for an additional condenser, a metal plate and an insulating strip co-operating with said bracket extension to form an additional condenser, an insulating strip lying flat against the base, and a conducting plate lying flat against the insulating strip to produce a second additional condenser.

3. In a variable condenser, a framework, a shaft journaled in said framework, rotor plates secured to said shaft, conducting brackets mounted on said framework and insulated from the rotor plates, stator plates mounted on said brackets, a separate conducting plate positioned substantially in parallel relation to one of said brackets, said bracket and said separate plate forming the two plates of an additional condenser.

THEODORE JOHNSON SCOFIELD.